H. ADAMS.
TREE FOR SIDESADDLES.
No. 25,375. Patented Sept. 13, 1859.
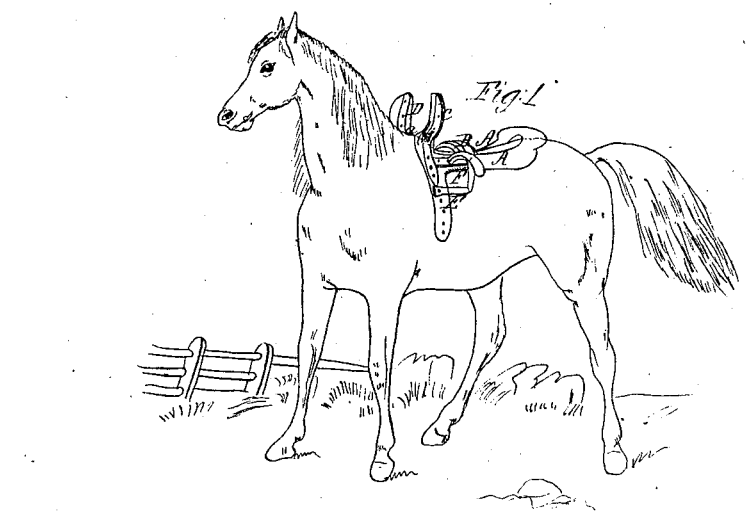
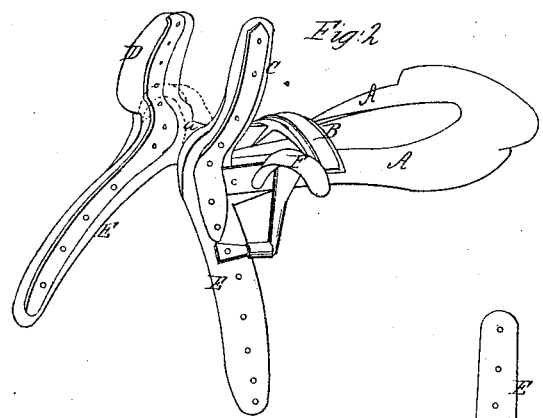
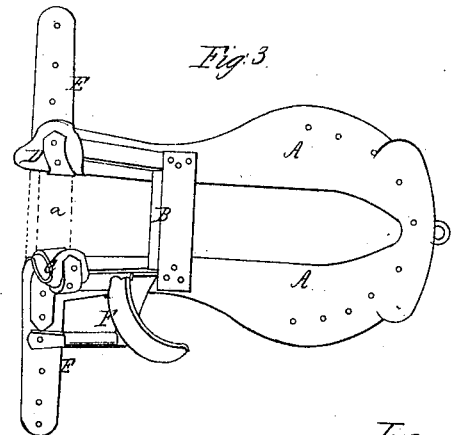
Witnesses
R. S. Spencer
J. W. Coombs
Inventor.
H. Adams

UNITED STATES PATENT OFFICE.

HENRY ADAMS, OF NEW YORK, N. Y.

SADDLE-TREE.

Specification of Letters Patent No. 25,375, dated September 13, 1859.

*To all whom it may concern:*

Be it known that I, H. ADAMS, of the city, county, and State of New York, have invented a new and useful Improvement in Trees for Side or Ladies' Saddles; and I do hereby declare that the following is a full, clear, and exact description of the same, reference being had to the annexed drawings, making a part of this specification, in which—

Figure 1, is a view of a horse with my improved tree applied to show the character of the invention. Fig. 2, a detached perspective view of my invention. Fig. 3, a detached plan or top view of ditto.

Similar letters of reference indicate corresponding parts in the several figures.

The object of this invention is to obtain a tree that will be capable of adjusting itself to the back of the animal and correspond to its size and form so that a perfect fitting saddle may invariably be obtained, one that will not injure the horse but fit snugly and comfortably on the back of the animal and at the same time form a more agreeable seat for the rider than those of usual construction.

The invention consists in connecting the two bars of the tree by a bridge, at a point which corresponds with the hollow or lowest parts of the back or dorsal vertebræ of the animal and dispensing with the "head" which has hitherto connected the front ends of the bars directly over the "withers" of the animal, the several parts forming the tree being arranged and disposed as hereinafter fully shown and described whereby the desired object is attained.

To enable those skilled in the art to fully understand and construct my invention I will proceed to describe it.

A, A, represent the two bars of my improved tree. These bars are of the usual form and are connected at their back ends as usual, but instead of being connected at their front ends as hitherto by a head as shown by the dotted lines in Figs. 2 and 3, they are connected by a bridge B, at a point some distance back of the front ends of the bars, so that when the saddle is on the back of the animal the bridge B, will be directly over the lowest point of the dorsal vertebræ. This will be clearly understood by referring to Fig. 1, the naked or uncovered tree being placed in proper position on the back of a horse.

C, D, represent the horns attached to the front ends of the bars A. These horns are of the usual form and are connected with the points E, E, of the tree as usual, but are not connected together as hitherto the head being dispensed with and thereby leaving an open space $a$, between the horns and the front ends of the bars. The leaping horn F, if used may be attached to its bar A, in the usual way.

It will be seen that the "head" usually employed passed directly over the "withers" and first dorsal vertebra of the animal, the highest point of the back and consequently is required to form quite a high arch so as not to injure or gall the animal. This result however cannot always be obtained for horses vary in flesh at different times and perfect fitting saddles are not always obtained. These and various other causes combined frequently bring the front or head of the saddle in contact with the front of the back of the animal producing in consequence of the friction severe excoriation. By my invention this difficulty is fully obviated as the high part of the back can project up between the front parts of the bars A, A. Another advantage attending my invention is that the horns C, D, may be placed lower than when the head is used and the leg of the rider instead of being necessarily elevated at an angle as hitherto, may be in a horizontal position as the base of the leg horn C, may be on a level with the seat. This low position of the horn C, cannot be obtained with the high head as the horn C, must be attached within a short distance of the summit to permit the leg to fit comfortably over it. The horizontal position of the leg insures an easy and far more agreeable seat than hitherto for the rider. Another advantage of my invention is that in consequence of dispensing with the head which connects the front ends of the bars A, A, a certain degree of elasticity is allowed the tree and consequently the saddle and the points E, E, may be contracted by the girth in case the saddle is rather large for the animal, the tree also is not so liable to break and a substantial saddle is obtained.

I would remark that my improved tree may be ironed in any suitable way to insure a proper degree of strength, the subsequent manufacture, towit, the padding, covering, etc., forms no part of the invention and therefore requires no description.

Having thus described my invention what I claim as new and desire to secure by Letters Patent, is,

A tree for side or ladies' saddles constructed by connecting the bars A, A, by a bridge B, at the point herein specified, and with an open space $a$, between the front ends of the bars at their junction with the horns C, D, for the purpose set forth.

HENRY ADAMS.

Witnesses:
R. S. SPENCER,
J. W. COOMBS.